106. COMPOSITIONS, COATING OR PLASTIC
82

Patented May 15, 1945

2,376,163

UNITED STATES PATENT OFFICE 2,376,163

COATING MATERIAL

Leopold H. Metzger, Chicago, Ill., assignor to Industrial Abrasives, Inc., Chicago, Ill., a corporation of Illinois No Drawing. Application August 12, 1940, Serial No. 352,275

5 Claims. (Cl. 106—82)

The present invention relates generally to coating materials. More particularly the invention relates to that type of coating material which is primarily designed or adapted for use in the fabrication of an abrasive element, such, for example, as an abrasive disc, serves as a bonding medium for the grit particles of the element and comprises as the main or principal ingredients thereof an alkaline silicate type base solution, a wetting agent to reduce the surface tension of the base solution and an agent chemically reactive with the base solution to give body to the material as a whole.

As evidenced by United States Patent No. 2,311,272, granted February 16, 1943, to Willis C. Ware, it has heretofore been proposed to employ in connection with a coating material of the aforementioned type, a liquid base solution comprising a mixture of a relatively small amount of low ratio sodium silicate solution embodying no more than two parts silica to one part sodium oxide and a greater amount of high ratio sodium silicate solution embodying more than two parts of silica to one part sodium oxide. Such a mixture is employed because of the hard bonding properties of the high ratio silicate solution and the fact that the low ratio sodium silicate solution acts as a plasticiser and eliminates brittleness. In practice it has been found that in comparatively dry atmospheres a coating material of the type and character set forth in said Ware patent effectively and efficiently fulfills its intended purpose. However, it has been found desirable, because of the effect on the bonding strength in moist or humid atmospheres, to employ a material having less tendency to react to such atmospheres. When moist atmospheres are encountered there is a tendency to form on the discs on which the adhesive-like material is used, a reaction product which ultimately forms a white or gray film or powder. Such film or powder detracts from the appearance and salability of the discs.

The primary object of the present invention is to provide a heat resisting adhesive type material which is a marked improvement upon previously devised materials of the same general type or character including that which is disclosed in, and forms the subject matter of Ware Patent No. 2,311,272. The improved material possesses unusual bonding strength and is superior to the material of said Ware patent in that its liquid base solution is better able to retain its bonding strength under varying atmospheric conditions and there is no appreciable tendency toward any reaction product. In addition the improved material has the valuable properties of the material of said Ware patent but is substantially free from discoloration.

Other objects of the invention and the various advantages and characteristics of the present coating material will be apparent from a consideration of the following detailed description.

The invention consists in the coating material which is hereinafter set forth and is more particularly defined by the claims at the conclusion hereof.

The improved coating material has particular utility or use in the fabrication of an abrasive element, such, for example, as an abrasive disc consisting of a flexible backing and a layer of grit particles on one face of the backing. It is essentially a hard bonding heat resisting material and may be used either as an adhesive or binder for uniting the grit particles to the backing or as a sizing or top coat. As its main ingredients or component parts the material comprises a base solution, a wetting agent, and a body-forming agent. The base solution is composed of a mixture of a comparatively large amount of high ratio potassium silicate and a small amount or quantity of plasticising material. The plasticising material is low ratio potassium silicate or a material having like properties and serves to eliminate brittleness. Low ratio potassium silicate is preferably employed because its hydroscopic tendencies are constant and as a result the material has less tendency to lose its bonding or adhesive strength when after setting it encounters moist or humid atmospheres. Low ratio potassium silicate is a solution comprising one part potassium oxide ($K_2O$) to no more than two parts silica ($SiO_2$). When low ratio potassium silicate is employed as the plasticiser medium or agent it augments the adhesive or bonding properties of the high ratio potassium silicate. By a high ratio potassium silicate solution it is to be understood that there shall be more than two parts of silica to one part potassium oxide. Potassium silicate solutions of relatively high density may be used. By employing a combination of high ratio potassium silicate and low ratio potassium silicate the material is hard bonding without being too brittle for its intended purpose and in addition is not affected to any marked degree by humidity changes. Aluminum silicate is preferably used as the body forming agent and when mixed as hereinafter described with the base solution, i. e., the combination or mixture of high ratio potassium silicate and the plasticising material, produces a sticky mass. As the result of the chemical action which gradually takes place between the body-forming agent and the base solution the material when fully set has great gripping and retaining properties and has the necessary body and adhesiveness to fulfill its intended purpose. By employing high ratio, potassium silicate as the major part of the base solution any tendency of the low ratio potassium silicate to absorb such an amount of water or moisture as to cause the material to lose its normal bonding properties is effectively counteracted or balanced. Instead of aluminum silicate the body-forming agent may be silica, magnesium silicate, strontium silicate, barium silicate, zinc silicate, cadmium silicate, zinc oxide or zinc carbonate, or a combination of such materials. The body-forming agents heretofore mentioned are highly reactive with the liquid base solution. Instead of highly reactive body-forming agents less reactive agents, such as calcium carbonate or calcium silicate may be used, either alone or in combination with any of the heretofore mentioned highly reactive body-forming agents. The wetting agent is preferably sulphonated castor oil. It serves to reduce the surface tension of the base solution and thus enables the coating material when the latter is used as a bonding medium in an abrasive disc to penetrate readily the pores of the flexible backing material. If desired a coloring agent such as burnt umber or raw sienna or a combination of the two may be employed. These two materials contain a high percentage of manganese oxide and iron oxide and hence chemically react with the base solution and promote hardening of the coating material when the latter is spread on the work.

An example of a reliable or practical formula is:

|  | Pounds |
|---|---|
| Liquid base solution (85% to 88% high ratio potassium silicate and 15% to 12% low ratio potassium silicate) | 315 to 385 |
| Body-forming agent (aluminum silicate) | 90 to 110 |
| Wetting agent (sulphonated castor oil) | 1½ to 2 |

If it is desired to use a coloring agent of the mineral type in connection with the aforementioned formula approximately five to ten pounds may be employed. Perferably no more than one-third as much body forming agent as base solution is used. By having three or more times as much base solution as body-forming agent, the coating material is capable of drying at normal atmospheric temperatures and has the desired flexibility when in a fully set or hardened condition. When the material is used as a backing medium in connection with extremely fine grit particles (aluminum oxide) it is not necessary to include the body-forming agent.

The coating material sets in a comparatively short time and it is essentially heat resistant and hard bonding and will not decompose to any appreciable extent under friction produced heat.

Whereas the coating material has been described as having the ingredients thereof mixed together in certain proportions, it is to be understood that except where the proportions have been described as critical other proportions than those specified may be used. For example, if the coating material is to be used in an extremely dry climate or location the amount of low ratio potassium silicate may be increased and the amount of high ratio potassium may be decreased. In humid or moist climates or locations it has been found in practice that it is desirable or advantageous to decrease the amount of low ratio potassium silicate and increase the amount of high ratio potassium silicate.

The invention is not to be understood as restricted to the specific proportions and ingredients set forth since these may be modified or changed within the scope of the appended claims without departing from the spirit and scope of the invention.

Having thus described the invention what I claim as new and desire to secure by Letters Patent is:

1. As a new composition of matter, a hard bonding heat resisting material comprising a mixture of a comparatively large amount of high ratio potassium silicate solution embodying more than two parts silica to one part potassium oxide and a smaller amount of low ratio potassium silicate solution embodying no more than two parts of silica to one part of potassium oxide, an admixture of no more than one-third the amount by weight of aluminum silicate, and an extremely small quantity of a wetting agent.

2. As a new composition of matter, a hard bonding heat resisting material comprising a mixture of 85 to 88 parts of high ratio potassium silicate solution embodying one part of potassium oxide to more than two parts silica and between 15 to 12 parts of low ratio potassium silicate solution embodying one part potassium oxide to no more than two parts silica, and an admixture of no more than one-third the amount by weight of aluminum silicate.

3. As a new composition of matter, a hard bonding heat resisting material comprising a mixture of a comparatively large amount of high ratio potassium silicate solution embodying more than two parts of silica to one part potassium oxide and a smaller amount of low ratio potassium silicate solution embodying no more than two parts silica to one part of potassium oxide, and a chemically reactive body forming agent in no more than one-third the amount by weight of the mixture and selected from the group consisting of aluminum silicate, silica, magnesium silicate, strontium silicate, barium silicate, zinc silicate, cadmium silicate, zinc oxide, zinc carbonate, calcium carbonate and calcium silicate.

4. As a new composition of matter, a hard bonding heat resisting material comprising a mixture of a comparatively large amount of high ratio potassium silicate solution embodying more than two parts of silica to one part of potassium oxide, and a smaller amount of low ratio potassium silicate solution embodying no more than two parts of silica to one part of potassium oxide; a chemically reactive body forming agent in less amount by weight than the mixture and selected from the group consisting of aluminum silicate, silica, magnesium silicate, strontium silicate, barium silicate, zinc silicate, cadmium silicate, zinc oxide, zinc carbonate, calcium carbonate and calcium silicate; and an extremely small amount of a wetting agent.

5. As a new composition of matter, a hard bonding heat resisting material comprising in substantially the proportions set forth between 315 to 350 parts by weight of a mixture of between 85% to 88% of high ratio potassium silicate solution embodying more than two parts silica to one part potassium oxide and 15% to 12% low ratio potassium silicate solution embodying no more than two parts silica to one part of potassium oxide; between 90 to 110 parts by weight of a chemically reactive body forming agent selected from the group consisting of aluminum silicate, silica, magnesium silicate, strontium silicate, barium silicate, zinc silicate, cadmium silicate, zinc oxide, zinc carbonate, calcium carbonate and calcium silicate; and between 1½ and 2 parts by weight of a wetting agent.

LEOPOLD H. METZGER.